United States Patent

Gass et al.

[11] Patent Number: 5,808,716
[45] Date of Patent: Sep. 15, 1998

[54] LIQUID CRYSTAL DEVICE AND METHOD OF MAKING A LIQUID CRYSTAL DEVICE

[75] Inventors: Paul Antony Gass; Michael John Towler; Tomoaki Kuratate, all of Oxford; Martin David Tillin, Oxfordshire; Harald Reinhart Bock; Harry Garth Walton, both of Oxford, all of United Kingdom

[73] Assignee: Sharp Kabushiki Kaisha, Osaka, Japan

[21] Appl. No.: 538,560

[22] Filed: Oct. 3, 1995

[30] Foreign Application Priority Data

Oct. 3, 1994 [GB] United Kingdom .................. 9419853

[51] Int. Cl.$^6$ .................................................. G02F 1/1337
[52] U.S. Cl. ........................ 349/124; 349/127; 349/129; 349/133
[58] Field of Search .................................. 359/62, 75, 76, 359/77, 78, 99, 100; 428/1; 430/20; 349/123, 124, 127, 132, 133, 187, 129

[56] References Cited

U.S. PATENT DOCUMENTS

| | | | |
|---|---|---|---|
| 4,838,658 | 6/1989 | Zondler | 350/339 |
| 5,515,190 | 5/1996 | Ogawa et al. | 359/76 |
| 5,528,401 | 6/1996 | Narutaki et al. | 359/76 |
| 5,576,862 | 11/1996 | Sugiyama et al. | 359/76 |

FOREIGN PATENT DOCUMENTS

| | | |
|---|---|---|
| 0307959 | 3/1989 | European Pat. Off. . |
| 0451820 | 10/1991 | European Pat. Off. . |
| 0467456 | 1/1992 | European Pat. Off. . |
| 0476543 | 3/1992 | European Pat. Off. . |
| 0586014 | 3/1994 | European Pat. Off. . |
| 0601895 | 6/1994 | European Pat. Off. . |
| 0604921 | 7/1994 | European Pat. Off. . |
| 0635749 | 1/1995 | European Pat. Off. . |
| 5241151 | 9/1993 | Japan . |
| 2194792 | 3/1988 | United Kingdom . |
| 2274652 | 8/1994 | United Kingdom . |

OTHER PUBLICATIONS

Search Report for U.K. Appl. 9419853.8, mailed Dec. 19, 1994.

Jin et al, SID 95 Digest, pp. 536–539, 1995, "Alignment of Ferroelectric Liquid Crystal Molecules by Liquid–Crystalline Polymer."

European Search Report for Application No. 95306984.6; dated Jan. 21, 1997.

*Primary Examiner*—Anita Pellman Gross
*Assistant Examiner*—Tai V. Duong

[57] ABSTRACT

A liquid crystal display includes glass cell walls on which are formed alignment layers. The cell is filled with liquid crystal material, such as FLC material. Chemical bonds are formed between the alignment layers and the adjacent liquid crystal layers so that the liquid crystal layers are bonded to the alignment layers in order to increase resistance to mechanical damage.

17 Claims, 2 Drawing Sheets

INITIAL SMECTIC LAYER STRUCTL

INITIAL DAMAGE, SMECTIC LAYERS STILL PINNED AT SURFACES

FURTHER FLOW UNPINS LAYERS AT SURFACES

LIQUID CRYSTAL DEVICE AND METHOD OF MAKING A LIQUID CRYSTAL DEVICE

TECHNICAL FIELD OF THE INVENTION

The present invention relates to a liquid crystal device and to a method of making a liquid crystal device.

BACKGROUND OF THE INVENTION

A parameter of a liquid crystal structure, such as director orientation or smectic layer structure, may be said to be actively aligned if alignment layers induce a preferred configuration on the parameter and, if the preferred configuration is perturbed, the alignment layers exert a restoring force or torque.

Conventional liquid crystal displays (LCDs) are not substantially degraded by the effect of mechanical distortion applied to the LCD. This is because the most important parameter determining the liquid crystal structure, namely the nematic director orientation at cell walls of the display, is actively controlled by alignment layers at the cell walls. However, for LCDs containing the more ordered smectic liquid crystal materials, alignment does not always recover after having been perturbed by mechanical stress.

Smectic LCDs and, in particular, ferroelectric LCDs are strong contenders for use in a wide range of display applications including large area high definition television (HDTV) displays, memory displays, and computer work stations. However, a major problem limiting the use of ferroelectric liquid crystal (FLC) materials in commercial LCDs is their sensitivity to mechanical damage. Known ways of reducing this problem are the use of damped mountings and adhesive spacer techniques for fabrication of FLC panels. However, these techniques are not effective against all possible types of mechanical damage, such as a sudden impact or continuous pressure.

For FLC display panels and other smectic LCDs, the structure of the smectic layers as well as the orientation of the director is an important parameter. For existing smectic LCDs, the smectic layer structure is only passively aligned by cooling through the nematic to smectic phase transition, i.e. there is no uniquely specified periodicity in the interaction between the alignment layer and adjacent liquid crystal molecules defining the alignment which the smectic layers should adopt. Thus, if this alignment is disturbed in the smectic phase, there is no force acting to restore the original alignment.

Although most nematic liquid crystal alignment techniques strongly control the nematic director orientation at the display cell walls, there are some alignment techniques, such as surface profile grating alignment, which are relatively weak. Thus, mechanical stress can also cause disruption of the liquid crystal structure in certain nematic LCDs.

GB 2 194 792 discloses a method for orientation of a liquid crystal involving chemical bonding. In particular, the material which is to form the alignment layers is at least partly chemically bonded before deposition on substrates and incorporation into a finished display structure. The embodiments disclosed in this specification all perform such chemical bonding entirely before deposition of the alignment layers. This may be because the detailed chemistry disclosed in this specification cannot be performed within the cell structure of a display and produces bi-products which would degrade the liquid crystal material within the cell. Further, the surface alignment of the liquid crystal is not established by means of the bulk liquid crystal structure so that this technique is impractical in providing active alignment.

JP 52 411 discloses an arrangement in which dichromatic molecules are bonded to an alignment layer. Liquid crystal molecules then align on the layer of dichromatic molecules.

EP 307 959, EP 604 921 and EP 451 820 disclose various techniques for obtaining particular structures within ferroelectric liquid crystal layers which are intended to provide improved mechanical stability. However, the structures disclosed in the specifications are incompatible with high speed high contrast addressing schemes and are therefore of very limited application.

GB 2 274 652 and EP 586 014 disclose arrangements in which a conventional low molar mass ferroelectric liquid crystal mixture is doped with a polymeric additive or a polymer network. This arrangement is intended to improve mechanical stability but has the disadvantage that switching speed is reduced.

EP 635 749 discloses an adhesive spacer technique for the fabrication of FLC display panels so as to provide more resistance to mechanical damage. However, as described hereinbefore, techniques of this type are not effective against all possible types of mechanical damage.

EP 467 456 discloses the use of a liquid crystal gel layer as an alignment layer. However, this type of alignment layer is used merely to control the pre-tilt angle of the liquid crystal material in the cell and does not improve the mechanical stability.

S. H. Jin et al, "Alignment of Ferroelectric Liquid-crystal Molecules by Liquid-Crystalline Polymer", SID 95 Digest, (1995) 536–539 discloses the use of a main chain thermotropic liquid crystal polymer as an alignment layer for a FLC cell. However, the liquid crystal alignment is obtained by conventional mechanical rubbing of this layer, the liquid crystal polymer being in its glassy phase at room temperature.

SUMMARY OF THE INVENTION

According to a first aspect of the invention, there is provided a method of making a liquid crystal device as defined in the appended claim 1.

According to a second aspect of the invention, there is provided a liquid crystal device as defined in the appended claim 8.

According to a third aspect of the invention, there is provided a liquid crystal device as defined in the appended claim 9.

According to a fourth aspect of the invention, there is provided a method of making a liquid crystal device as defined in the appended claim 13.

According to a fifth aspect of the invention, there is provided a method of making a liquid crystal device as defined in the appended claim 17.

Preferred embodiments of the invention are defined in the other appended claims.

Observations of flow in smectic liquid crystal cells have demonstrated that the smectic layer structure can recover from the effects of flow in the centre of the liquid crystal layer so long as the smectic layer alignment at the surface is not disturbed. Also, it has been observed that smectic liquid crystal material can flow through regions where the normal "virgin" structure of the layers has been destroyed and then reform the virgin structure when it flows into a region where the smectic layers are still aligned at the surface. By increasing the strength with which the smectic layers are aligned in a smectic LCD, increased resistance to mechanical damage is obtained. This is the result of two processes. According to the first process, active control of the smectic layer structure increases the level of mechanical stress which is required to disrupt the smectic layering. According to the second process, active control of the smectic layer structure permits the smectic layers to recover after disruption has occurred. It is thus possible to provide LCDs which are much more capable of resisting mechanical damage.

These techniques can be applied to smectic LCDs and also to other types such as nematic LCDs which otherwise use weak alignment techniques. These techniques are particularly advantageous where a LCD has large area which makes conventional alignment techniques impractical or where side effects of conventional alignment techniques can damage the display panel, for instance damage of active matrix panels by static charge generated by rubbed polymer alignment techniques.

It is thus possible to provide a technique for achieving active alignment of a liquid crystal structure parameter by fixing molecules of a liquid crystal material adjacent to an alignment layer to the alignment layer by chemical bonding. By performing the chemical bonding during manufacture when the liquid crystal material has filled the cell, the desired alignment of the liquid crystal material is established and this alignment is fixed at the interface between the liquid crystal layer and the alignment layer. Thus, the desired alignment is readily achieved by a form of active alignment.

It is also possible to provide another form of active alignment defined by the interaction between an alignment controlling layer containing liquid crystal material and the liquid crystal layer of the display. The conventional alignment layer aligns the liquid crystal material in the or each alignment controlling layer, which is then fixed. The interaction between the alignment controlling layer and the liquid crystal layer of the display then provides the active alignment. It is believed that the interaction potential between the alignment layer and the liquid crystal molecules has a controlled periodicity which induces the required structure, for instance the smectic layer structure. The alignment layer periodicity may not need to be equal to the smectic pitch of the liquid crystal material although the respective periodicities should be at I similar.

BRIEF DESCRIPTION OF THE DRAWINGS

The invention will be further described, by way of example, with reference to the accompanying drawings, in which:

FIG. 4b is a schematic top view of FIG. 4a; and

DETAILED DESCRIPTION OF THE PREFERRED EMBODIMENTS

Figure 1:
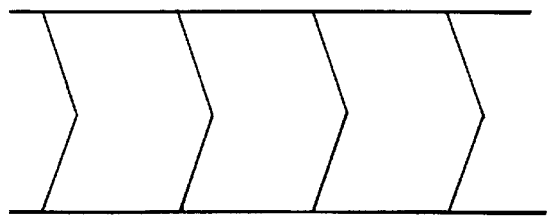
FIGS. 1 to 3 are schematic diagrams illustrating smectic layer structure and progressive perturbation thereof caused by mechanical stress.

FIG. 1 illustrates the typical or initial smectic layer structure of a smectic LCD. This structure is typified by the chevron arrangement of layers in the smectic liquid crystal.

Figure 2:
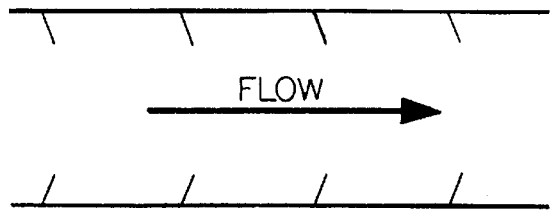

A process by which mechanical damage may occur is as follows. When a LCD of this type is subjected to mechanical stress, the liquid crystal material is made to flow relative to the cell walls. This flow initially damages the structure of the liquid crystal material in the middle of the cell away from the cell walls but the smectic layers adjacent the cell walls remain aligned as illustrated in FIG. 2. If the stress is removed and the flow ceases, the display is capable of recovering and re-establishing the structure illustrated in FIG. 1.

Figure 3:
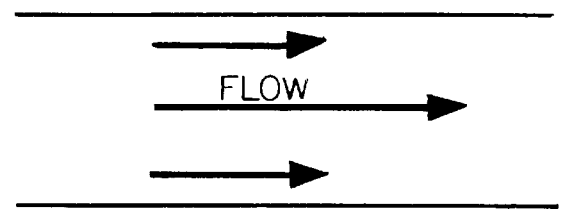

Continued or greater mechanical stress causes further flow of the liquid crystal material in the cell, as illustrated in FIG. 3. The further flow causes loss of alignment of the smectic layers adjacent the cell walls so that the smectic layer structure is substantially destroyed. Loss of alignment of the smectic layers at the alignment layer surfaces results in permanent damage to the LCD or part thereof because the normal smectic layer chevron structure cannot reform.

Figure 4A:
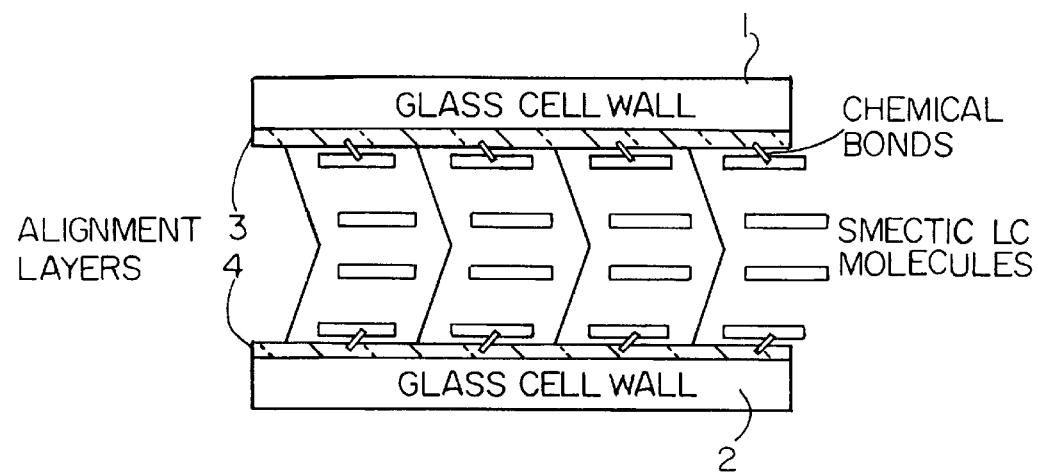
FIG. 4a is a schematic cross sectional diagram illustrating a LCD constituting a first embodiment of the invention.

FIG. 4a illustrates a LCD comprising glass cell walls 1 and 2 having opposing surfaces which are provided with alignment layers 3 and 4. The space between the alignment layers 3 and 4 is filled with a smectic liquid crystal material, such as a FLC. Other parts of the display, such as electrodes, are not shown for the sake of clarity.

The smectic liquid crystal molecules adjacent the alignment layers 3 and 4 are chemically bonded to the alignment layers so as to provide active alignment. Thus, when the LCD is subjected to mechanical stress, the smectic layers remain bonded to the surfaces of the alignment layers 3 and 4 and are not substantially disrupted. Even if the mechanical stress is sufficient to cause flow of liquid crystal material within the cell, the surface layers of liquid crystal material are not disrupted. When the mechanical stress is removed, the liquid crystal material regains the smectic layer structure illustrated in FIG. 1, so that the LCD is not permanently damaged.

Figure 4B:
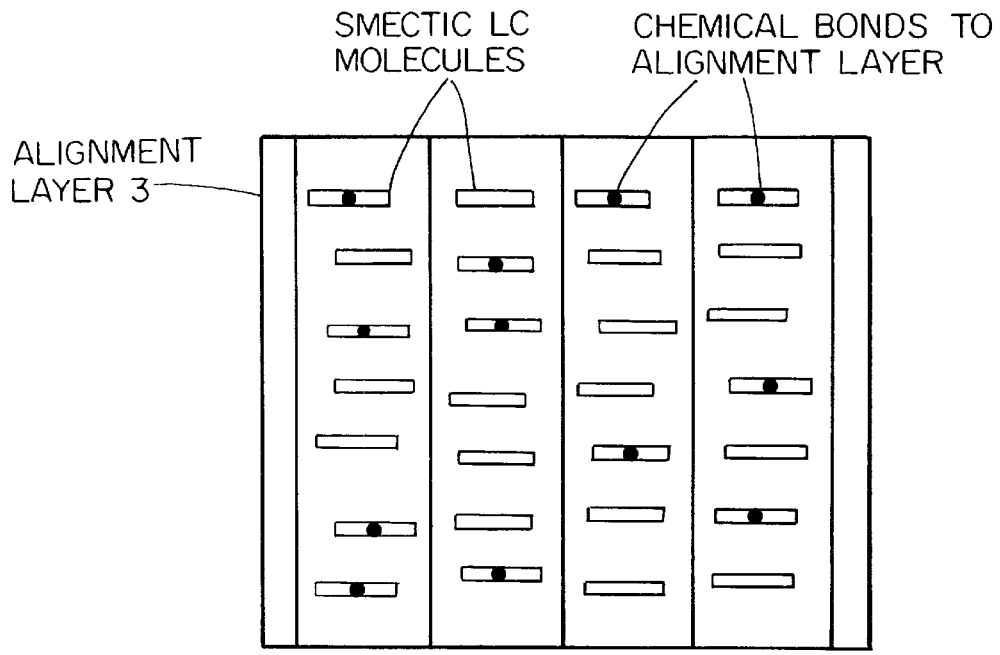

FIG. 4b is a top view of the LCD shown in FIG. 4a. For clarity, only the smectic LC layer adjacent one of the alignment layers 3 and 4 is shown. Indicated are the smectic LC molecules which are chemically bonded to the alignment layer. It is not necessary that all smectic LC molecules adjacent the alignment layer are chemically bonded to that layer.

Clearly, the chemically bonded smectic LC molecules are prevented from moving in either dimension in the plane of the cell wall.

Three techniques for making the liquid crystal cell and, in particular, the chemical bonds will now be described.

In accordance with the first technique, the inner surfaces of the glass plates forming the cell walls 1 and 2 are coated with alignment layers which contain reactive groups, such as acrylates. The cell is then filled with FLC material and the smectic structure is initially aligned as usual by cooling from the higher temperature phases. At the correct temperature to obtain the required smectic layer structure, chemical bonding between the reactive groups in the alignment layers 3 and 4 and the FLC molecules is induced, for instance by ultraviolet illumination. Thus, layers of FLC molecules which have the required smectic layer structure are permanently bonded to the alignment layers 3 and 4. Mechanical damage cannot break the chemical bonds so that the LCD has enhanced resistance to mechanical damage.

According to the second technique, the inner surfaces of the glass plates forming the cell walls 1 and 2 are coated with normal or conventional alignment layers. The cell is filled with FLC material containing a suitable proportion of reactive mesogens, for example mesogenic molecules containing acrylate groups. These reactive groups may be located either directly on the rigid core of the mesogenic molecule or on a flexible alkyl chain. After filling the cell with the FLC material, the smectic structure is initially aligned as usual by cooling from the higher temperature phases. At the correct temperature to obtain the required smectic layer structure, chemical bonding between the reactive mesogens and the alignment layer is induced, for example by ultraviolet illumination. Thus, FLC molecules having the required smectic layer structure are permanently bonded to the alignment layers 3 and 4. Mechanical damage cannot break the chemical bonds and so the LCD has enhanced resistance to mechanical damage. Further, a network structure may also be formed in the bulk of the FLC layer because of bonding between reactive mesogens. This network structure further stabilises the smectic layers in the bulk of the FLC layer and so further enhances the resistance to mechanical damage, but may result in a reduction of the switching speed of the display.

According to the third technique, the opposing surfaces of the glass plates forming the cell walls 1 and 2 are coated with alignment layers containing reactive groups. The FLC material contains a suitable proportion of reactive mesogens, the reactive groups being located either directly on the rigid core of the mesogenic molecule or on a flexible alkyl chain. The reactive groups in the FLC material and in the alignment layers have the property that selective bonding occurs primarily between a group in the FLC material and one in the alignment layer, but not between groups in the FLC material or between groups in the alignment layers. After filling the cell with the FLC material, the smectic structure is initially aligned as usual by cooling from the higher temperature phases. At the correct temperature to obtain the required smectic layer structure, chemical bonding between the reactive groups in the alignment layers and in the FLC material is induced, for instance by ultraviolet illumination. Thus, layers of molecules having the required smectic layer structure are permanently bonded to the cell walls. Mechanical damage cannot break the chemical bonds so that the resistance of the LCD to mechanical damage is enhanced.

Various other photoinduced reactions may be used in the third technique to bond the FLC molecules to the alignment layer. It is considered that bonding between the FLC material and the alignment layers can be effected by reaction between olefinic groups in the alignment layer and keytones, pyrroles or, mercaptans in the liquid crystal molecules. Two of these photoinduced reactions are illustrated as follows:

LC molecule containing ketone group + alignment layer containing olefin group.

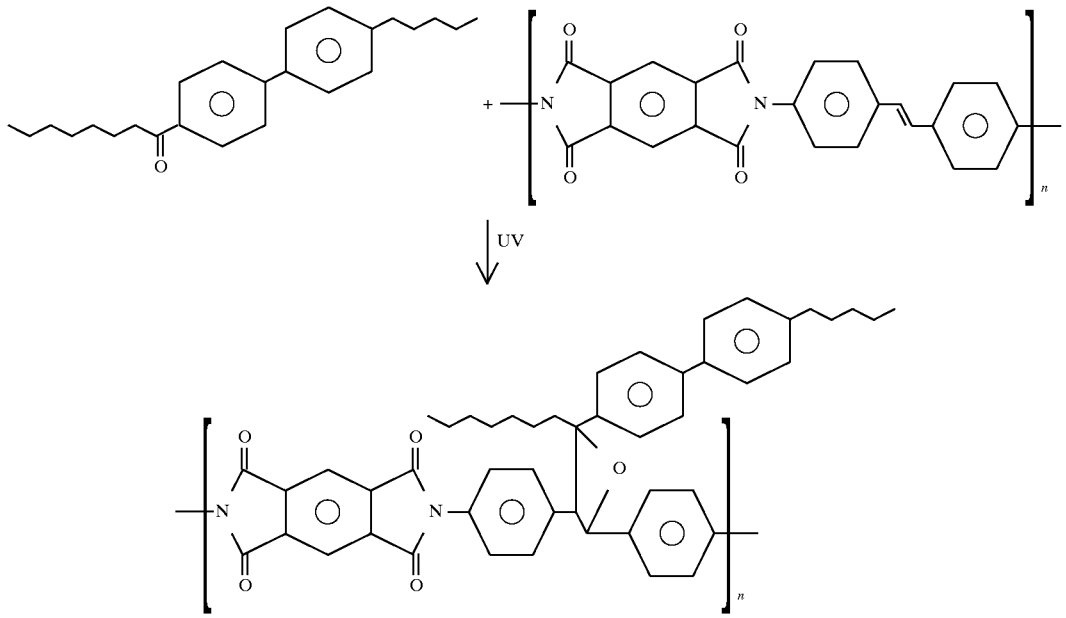

LC molecule containing pyrrole group + alignment layer containing olefin group.

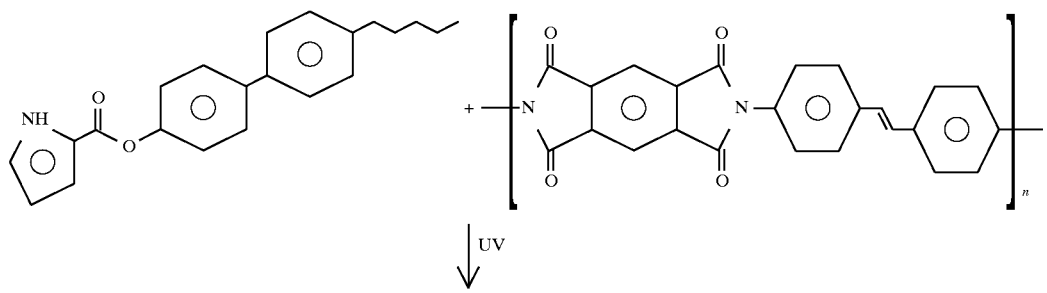

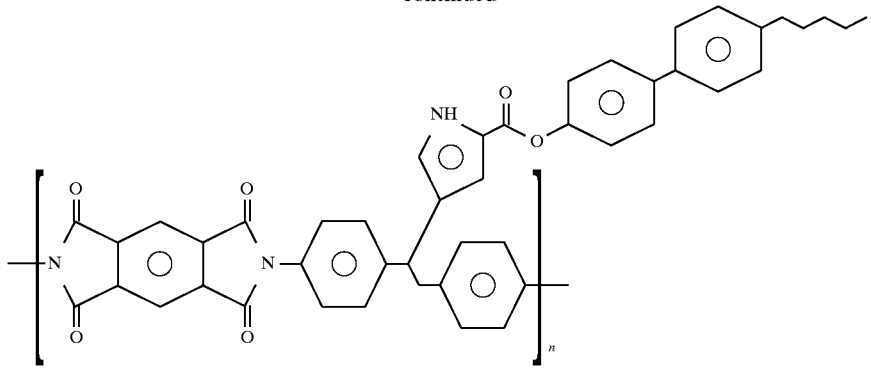

However, there are many other candidates for providing this bonding, some of which are listed in the following table:

| Reactive group in alignment layer | Reactive group in LC Molecules |
|---|---|
| Olefins | Mercaptans |
| Olefins | Other olefins & Alkynes |
| Olefins | Halogen alkanes |
| Olefins | Alcohols |
| Olefins | Aldehydes |
| Olefins | Quinones |
| Olefins | Sulphonic acid derivatives |
| Olefins | Thiocarbonyl compounds |
| Alkynes | Halogen alkanes |
| Alkynes | Alcohols |
| Alkynes | Mercaptans |
| Alkynes | Amines |
| Aromatic & heteroaromatic compounds | Other (hetero) aromatic cpds. |
| Aromatic & heteroaromatic compounds | Maleic acid derivatives |
| Aromatic & heteroaromatic compounds | Olefins & alkynes |
| Aromatic & heteroaromatic compounds | Alcohols |
| Aromatic & heteroaromatic compounds | Ethers |
| Aromatic & heteroaromatic compounds | Amines |
| Aldehydes & ketones | Alcohols |
| Aldehydes & ketones | Hydrocarbons |
| Unsaturated compounds (including the 4 groups above) | Si—H bonds |

Figure 5:
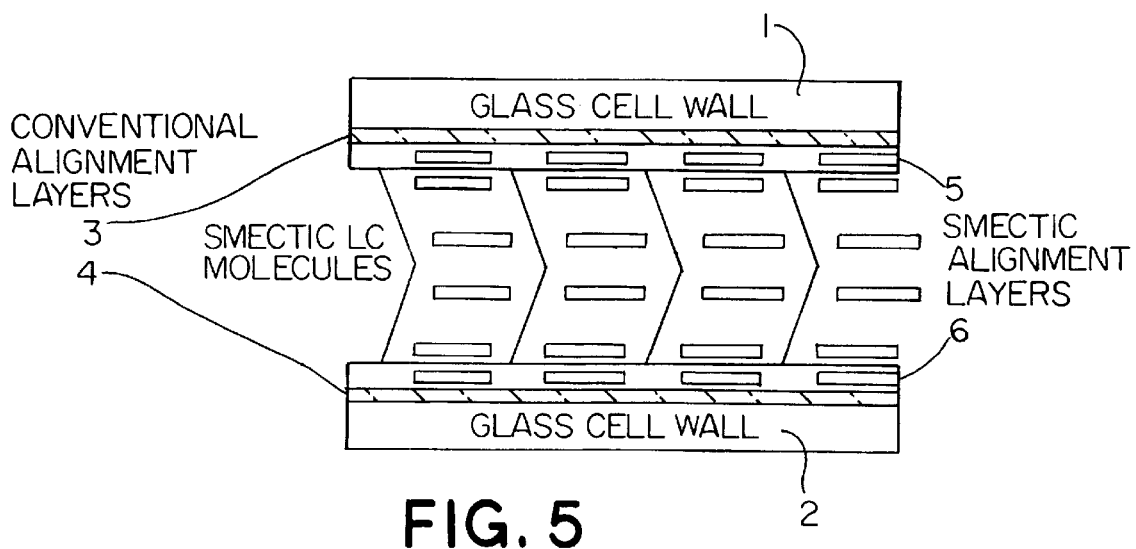
FIG. 5 is a schematic cross sectional diagram illustrating a LCD constituting a second embodiment of the invention.

The LCD shown in FIG. 5 differs from that shown in FIG. 4 in that the alignment layers 3 and 4 are of conventional type. In addition, smectic alignment layers 5 and 6 are formed on the alignment layers 3 and 4 and have or contain a smectic structure which is fixed to the alignment layers 3 and 4 and which causes the FLC material to be correctly aligned with the required smectic layer structure. Two techniques for making the LCD shown in FIG. 5 will now be described.

According to the first technique, after the conventional alignment layers 3 and 4 have been formed, the alignment layers 5 and 6 comprising a reactive mesogen are deposited. The reactive mesogen has a smectic phase, the smectic pitch of which can be controlled by temperature. The reactive mesogen aligns on the alignment layers 3 and 4 and, at the correct temperature for obtaining the required smectic structure, the layers 5 and 6 are polymerised, for example by ultraviolet illumination. The cell is then filled with FLC material in the conventional manner. The alignment layers 5 and 6 formed by the polymerised reactive mesogen have the normal property of aligning the liquid crystal director but have the additional property of actively aligning the smectic layering of the FLC material. Thus, the resistance of the LCD to mechanical damage is enhanced.

According to the second technique, after deposition of the conventional alignment layers 3 and 4 on the opposing surfaces of the glass cell walls 1 and 2, the further alignment layers 5 and 6 comprising a mixture of a reactive compound and a smectic liquid crystal material are deposited. This mixture aligns on the alignment layers 3 and 4 and, at the correct temperature to obtain the required smectic layer pitch and orientation, the layers 5 and 6 are polymerised, for instance by ultraviolet illumination, forming a gel. The cell is then filled with FLC material in the conventional manner. The alignment layers 5 and 6 thus formed by the polymerised gel have the normal property of aligning the liquid crystal director but have the additional property of actively aligning the smectic layering of the FLC material. Thus, the resistance of the LCD to mechanical damage is enhanced.

It is thus possible to provide LCDs employing smectic liquid crystal materials, such as FLCs, whose resistance to damage caused by mechanical stress is substantially increased compared with known LCDs of this type. Further, the arrangement shown in FIG. 4 and the techniques for making this arrangement described hereinbefore may be used with nematic and chiral nematic liquid crystal materials so as to increase the resistance to damage in LCDs where the liquid crystal material is not strongly aligned at the surfaces of the alignment layers.

What is claimed is:

1. A method of making a liquid crystal device, comprising forming a cell having opposed alignment layers defining a volume therebetween, filling the volume with a liquid crystal material, and chemically bonding at least one of the alignment layers to adjacent molecules of the liquid crystal material so as to fix the alignment of the liquid crystal material at the surface of the at least one of the alignment layers.

2. A method as claimed in claim 1, wherein the chemical bonding is photoinduced.

3. A method as claimed in claim 2, wherein the chemical bonding is induced by ultraviolet irradiation.

4. A method as claimed in claim 1, wherein the liquid crystal material contains a reactive compound which bonds chemically to the at least one of the alignment layers.

5. A method as claimed in claim 3, wherein the liquid crystal material contains a reactive compound which bonds chemically to the at least one of the alignment layers and the reactive compound comprises a reactive mesogen.

6. A method as claimed in claim 1, wherein the at least one of the alignment layers contains a reactive group which bonds chemically to the liquid crystal material.

7. A method as claimed in claim 4, wherein the at least one of the alignment layers contains a reactive group which bonds chemically to the liquid crystal material and the reactive compound bonds chemically to the reactive group.

8. A liquid crystal device made by a method as claimed in claim 1.

9. A liquid crystal device comprising a liquid crystal layer contained between opposing alignment layers, wherein at least one periodic alignment controlling layer is disposed between a respective one of the alignment layers and the liquid crystal layer and the at least one periodic alignment controlling layer contains a liquid crystal material which has a predetermined pitch and the alignment of said liquid crystal material is defined by the respective alignment layer and fixed.

10. A device as claimed in claim 9, wherein the liquid crystal material is a smectic liquid crystal material.

11. A device as claimed in claim 9, wherein the at least one of the alignment controlling layers comprises a reactive mesogen which is polymerised in its smectic state.

12. A device as claimed in claim 9, wherein the at least one of the alignment controlling layers comprises a smectic liquid crystal and a reactive compound which is polymerised.

13. A method of making liquid crystal device comprising:

forming a cell having opposed alignment layers;

forming at least one periodic alignment controlling layer on a respective one of the alignment layers, the at least one of the alignment controlling layer containing a liquid crystal material which has a predetermined pitch and the alignment of said liquid crystal material is defined by the respective alignment layer;

fixing the alignment of the liquid crystal material; and filling the cell with a liquid crystal layer.

14. A method as claimed in claim 13, wherein liquid crystal material is a smectic liquid crystal material.

15. A method as claimed in claim 13, wherein the at least one alignment controlling layer comprises a reactive mesogen which is cooled to its smectic state and then polymerised.

16. A method as claimed in claim 13, wherein the at least one alignment controlling layer comprises a mixture of a smectic liquid crystal and a reactive compound which is polymerised after the smectic liquid crystal has been cooled to its smectic state.

17. A liquid crystal device made by a method as claimed in claim 13.

* * * * *